Oct. 11, 1955                M. B. LAYNE ET AL                2,720,132
                              WORK HOLDING TOOL
Filed Aug. 1, 1949                                       5 Sheets-Sheet 3
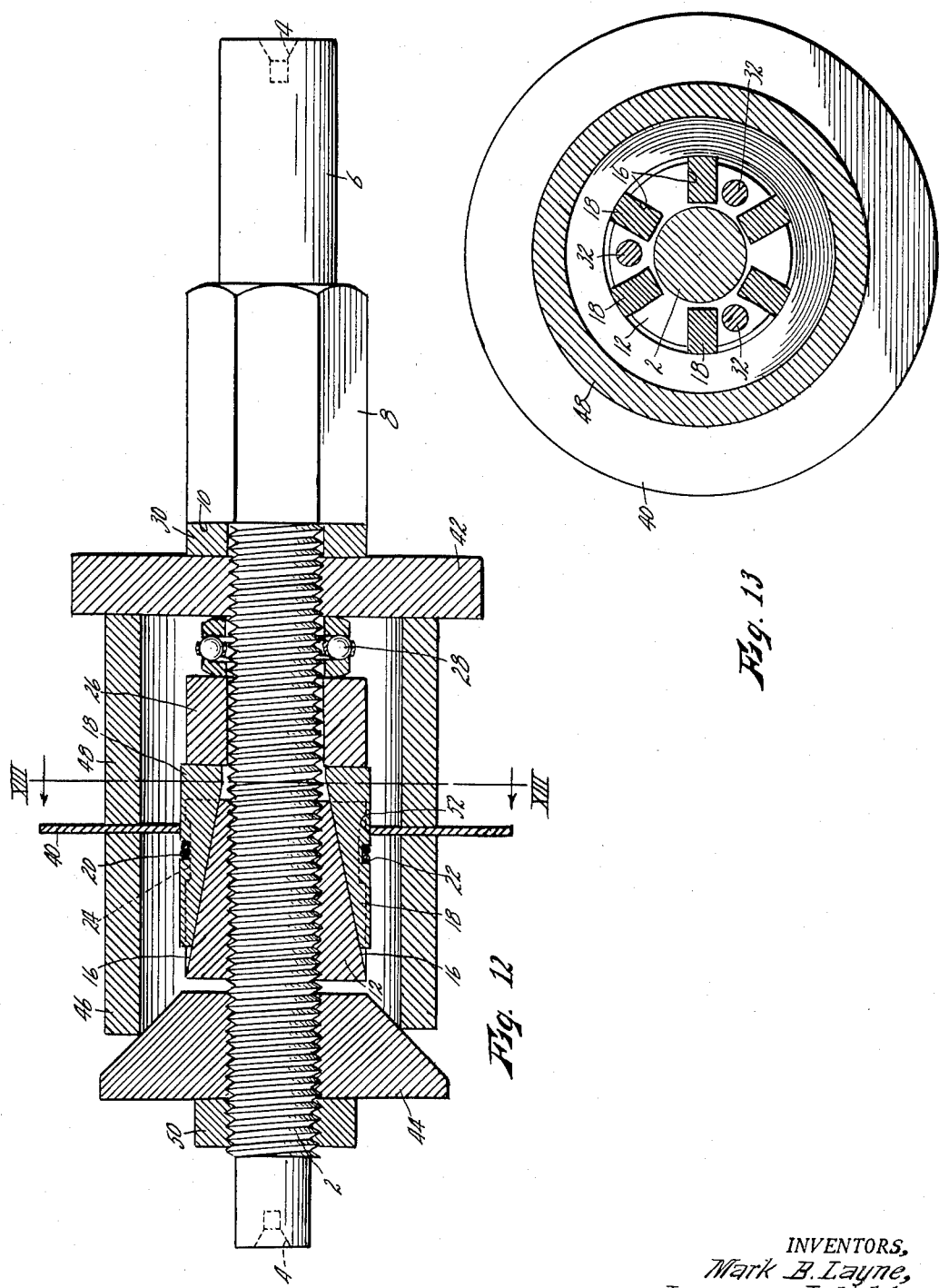
INVENTORS,
*Mark B. Layne,*
BY *Lawrence L. Held.*
*Roy E. Hamilton,*
Attorney.

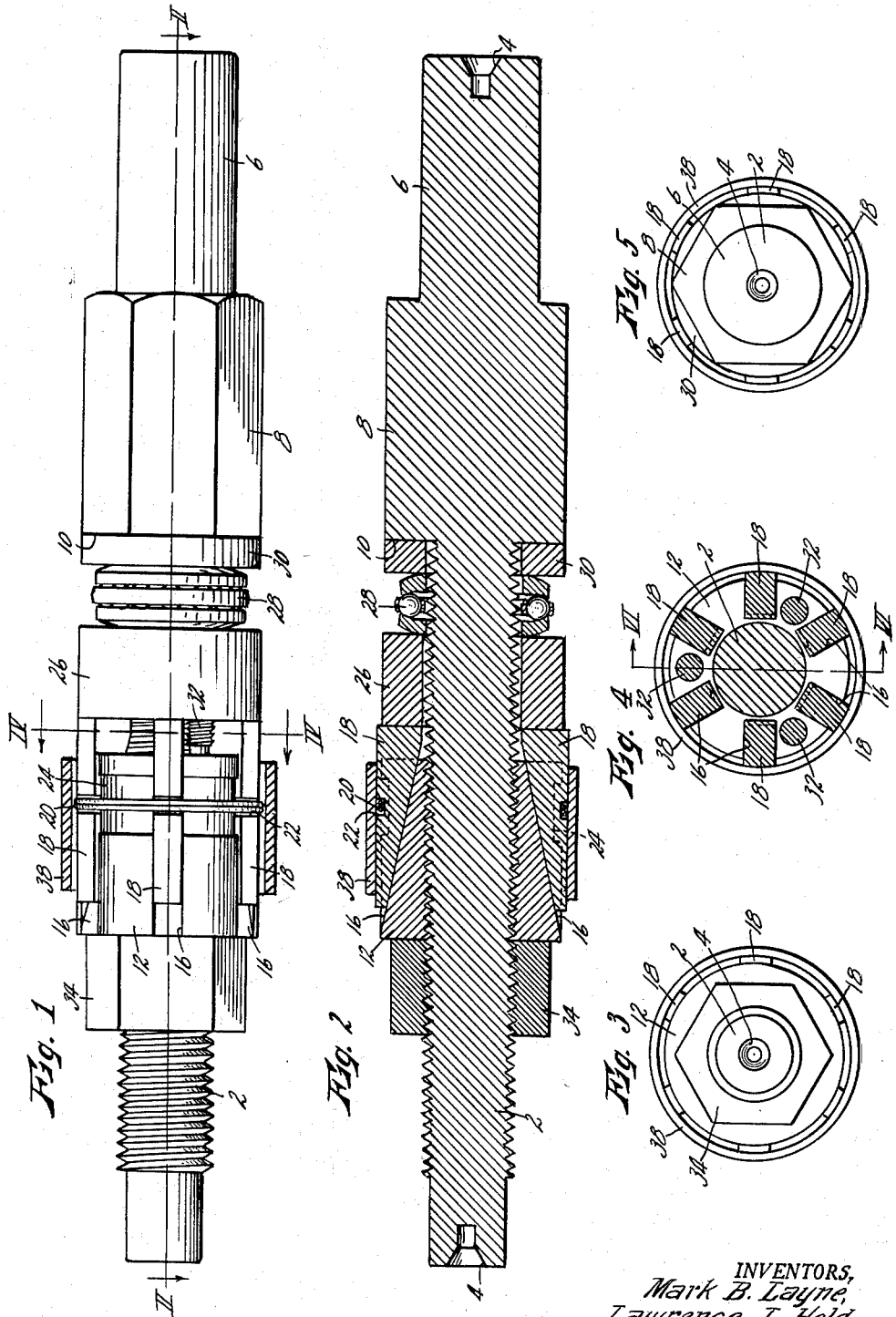

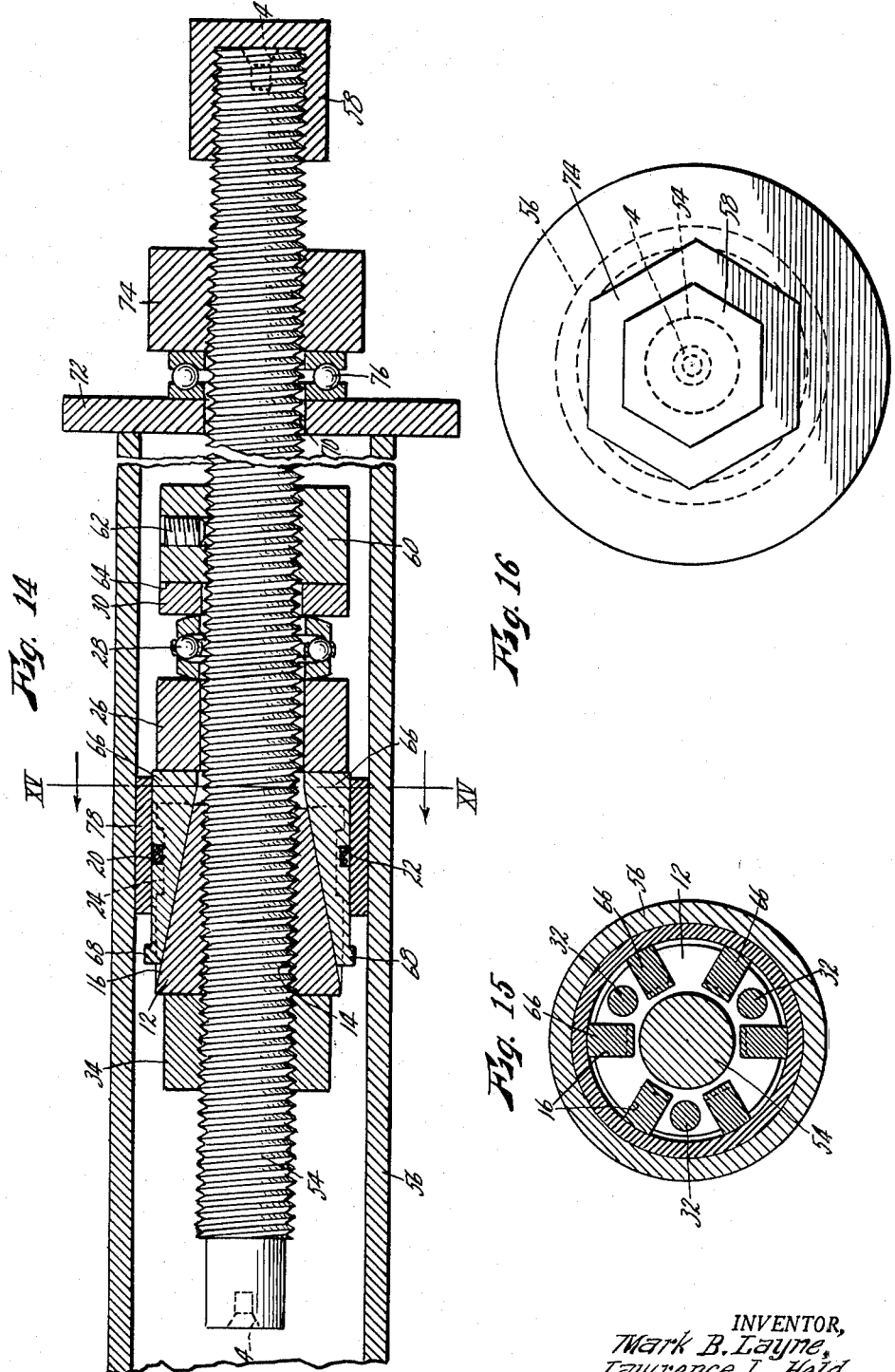

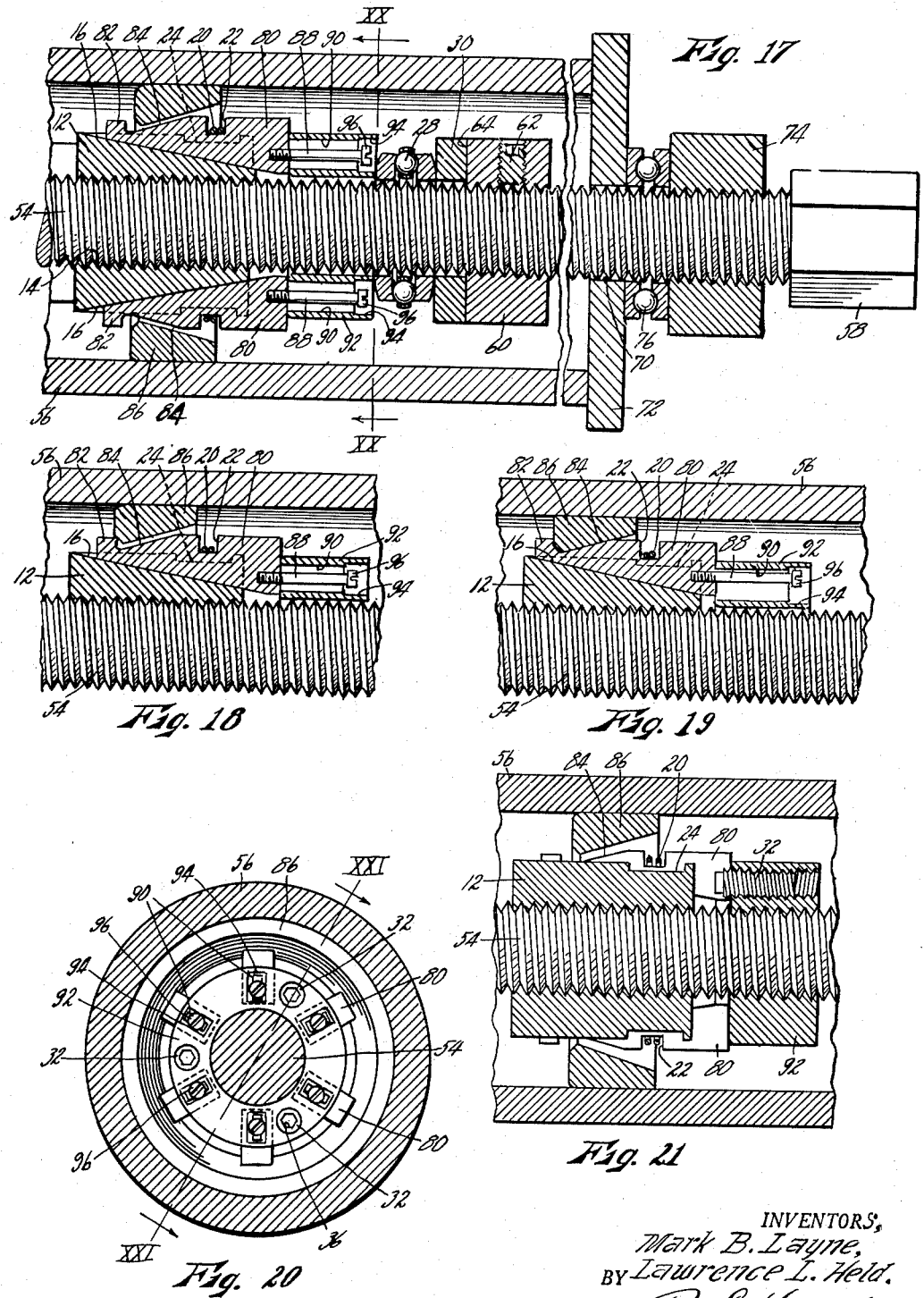

United States Patent Office 2,720,132
Patented Oct. 11, 1955

2,720,132

WORK HOLDING TOOL

Mark B. Layne and Lawrence L. Held, Higginsville, Mo.

Application August 1, 1949, Serial No. 107,938

2 Claims. (Cl. 82—44)

This invention relates to new and useful improvements in work holding and bearing pulling tools, and is in part an improvement over the device covered by our co-pending application, Serial No. 86,734, filed April 11, 1949, now Patent No. 2,659,260 issued November 17, 1953.

The principal object of the present invention is the provision of a work holding tool comprising a mandrel suitable for being held in a lathe, chuck, drill press, vise, or the like, and having wedges carried by and expansible radially from said mandrel to center and grip hollow work positioned over said mandrel, and having means for limiting the outward movement of said wedges. This limiting means provides a method for setting the wedges at any desired diameter, and is particularly useful in preventing damage or deformation to thin walled work by overloading it with said wedges.

Another object is the provision of a work holding tool wherein the means for limiting the radial movement of the wedges is adjustable, thereby adapting the tool to hold work having a wide range of internal diameters.

A further object is the provision of a work holding tool of the class described adaptable to hold planar work in a plane at right angles to the axis of the mandrel and having clamping means for supporting said work in a direction parallel to the axis of the mandrel, and means whereby the expansion of the wedges and the clamping means is limited to prevent undue pressure on said work.

A still further object is the provision of work-holding tool of the character described which by minor adaptation may be fitted for use as a tool for pulling bearing races, bushings, or sleeves from bearing housings, the wedge limiting means serving as a means for preventing the wedges from marring the operative surfaces of said bearing members.

Other objects are simplicity and economy of construction, dependability and efficiency of operation, and adaptability for a wide variety of uses wherever a tool for gripping or manipulating work by means of an internally positioned tool is desired.

With these objects in view, as well as other objects which appear in the course of the specification, reference will be had to the drawing, wherein:

Figure 1 is a side elevation of a work holding tool embodying the present invention, a tubular piece of work, shown in longitudinal section, being operatively engaged by said tool.

Figure 2 is a longitudinal section of the tool taken on line II—II of Fig. 1.

Figure 3 is a left-end view of the tool as shown in Fig. 1.

Figure 4 is a sectional view taken on line IV—IV of Fig. 1.

Figure 5 is a right-end view of the tool as shown in Fig. 1.

Figure 12 is a view similar to Fig. 2 with the mandrel left in elevation, and showing the tool adapted to hold thin planar work at right angles to the axis of the mandrel.

Figure 13 is a sectional view taken on line XIII—XIII of Fig. 12.

Figure 14 is a longitudinal section, with parts left in elevation, of the tool adapted for use as a bearing puller, and shown in operative position relative to a bearing bushing.

Figure 15 is a section taken on line XV—XV of Fig. 14.

Figure 16 is a right-end view of the tool as shown in Fig. 14.

Figure 17 is a fragmentary longitudinal section, with parts left in elevation of the tool adapted for use in pulling bearing races of tapered roller bearings, and shown at an intermediate point in the process of engaging the wedges with the race.

Figure 18 is a fragmentary view similar to Fig. 17, showing another point in the process of engaging the wedges with the race.

Figure 19 is a fragmentary view similar to Fig. 17, with the wedges fully engaged with the race.

Figure 20 is a sectional view taken on line XX—XX of Fig. 17.

Figure 21 is a fragmentary section taken on line XXI—XXI of Fig. 20.

Figure 6:
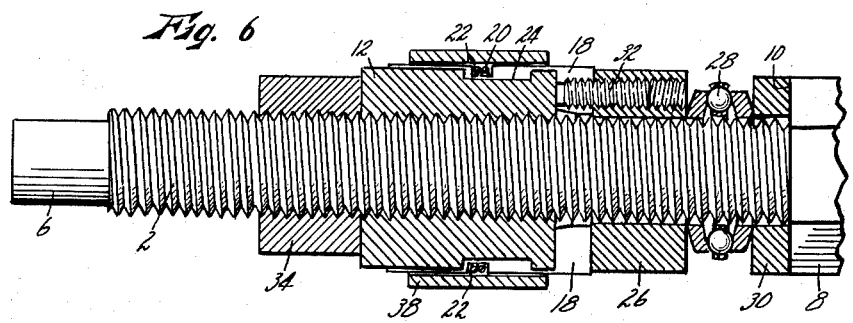
Figure 6 is a fragmentary section taken on line VI—VI of Fig. 4.
Figure 7:
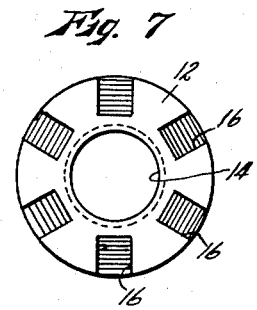
Figure 7 is an end view of the body member.
Figure 8:
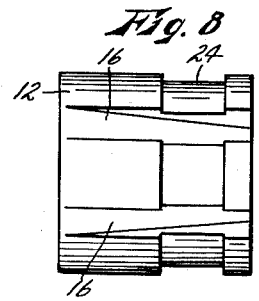
Figure 8 is a side view of the body member.
Figure 9:
Figure 9 is an edge view of the wedge retaining ring.
Figure 10:
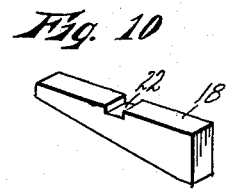
Figure 10 is a perspective view of one of the wedges.
Figure 11:
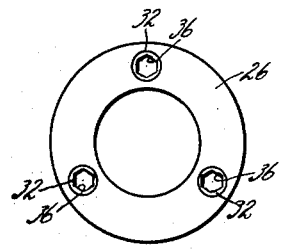
Figure 11 is an end view of the sleeve carrying the limiting screws.

Like reference numerals apply to similar parts throughout the several views, and in Figs. 1 to 13, the numeral 2 applies to a mandrel having countersunk recesses 4 formed centrally in its opposite ends, whereby the mandrel may be mounted between lathe centers. One end portion 6 of said mandrel is provided with a smooth surface, and is adapted to be gripped in a chuck, vise, or the like. Immediately adjacent portion 6 is an enlarged hexagonal section 8 which serves as a wrench lug and which provides a shoulder 10 at its inner end, the function of which is explained hereinafter. The major portion of the mandrel is threaded. A cylindrical body member 12 is provided with an internally threaded axial bore 14 which adapts said body member to be threaded on the mandrel with a free running fit. The peripheral surface of said body member is formed to present a plurality of longitudinal grooves 16 spaced equally about the circumference of said body member, and tapering evenly in depth from one end of said body member to the other. While six grooves are shown in the drawing, it will become apparent that a larger or smaller number could be used if desired.

Carried slidably in each of grooves 16 is an elongated wedge 18 having its inner surface tapered correspondingly to the base of said groove, and having its outer surface parallel with the axis of the mandrel and body member. When said wedges are moved toward the shallow ends of grooves 16, their outer edges will be projected outwardly from the surface of body member 12, as shown in Figs. 1 to 6, and when said wedges are moved toward the deeper ends of said grooves, their outer edges will be retracted beneath the surface of the body member. Wedges 18 are retained at all times in grooves 16 by means of a split ring 20 formed of resilient wire or other suitable material which encircles body member 12 circumferentially and engages a transverse notch 22 formed in the outer surface of each of the wedges. Said ring comprises more than one turn of wire in order to provide an unbroken periphery to prevent escape of the wedges, and is split to provide for expansion. Notches 22 provide that ring 20 is disposed inwardly from the diameter established by the outer surfaces of wedges 18, so as not to interfere with the gripping action of said wedges. A relatively broad peripheral groove 24 is formed about body member 12 adjacent the deeper ends of grooves 16 for accommodating ring 20 and permitting limited longitudinal movement of the wedges relative to the body member.

Wedges 18 are so proportioned as to project outwardly at all times from the deeper ends of grooves 16, and are adapted to abut at their outer ends against the end surface of an annular sleeve 26 which is carried for rotation and longitudinal movement on mandrel 2. Carried on mandrel 2 at the opposite end of sleeve 26 is a thrust ball bearing 28, and then an anti-friction collar 30, which bears against shoulder 10 of hexagonal enlargement 8 of the mandrel. Threaded into sleeve 26 parallel to mandrel 2, and spaced equally about the circumference of said sleeve, are a plurality of limit screws 32. Said screws project longitudinally from the sleeve and are adapted to abut against the adjacent end of body member 12 intermediate wedges 18, to limit the movement of said sleeve toward the body member and hence to limit the outward radial travel of the wedges. The opposite ends of each of said screws is provided with a non-circular recess 36 for receiving an Allen wrench or the like. A lock nut 34 is screwed on the mandrel at the opposite end of the body member.

The operation of the tool in holding tubular work, including the operation of limit screws 32, is substantially as follows: Lock nut 34 is backed off and body member 12 screwed away from sleeve 26 until wedges 18 can move sufficiently toward the deeper ends of grooves 16 to permit the tubular work 38 to be slipped over the body member and wedges. Mandrel 2 and body member 12 are then rotated relatively so that sleeve 26 faces wedges 18 toward the shallow ends of grooves 16. The wedges are thus forced outwardly to engage work 38. When a hand tight engagement of the wedges has been obtained, the body member and sleeve 26 are backed away from bearing 28 in order to permit screws 32 to be engaged by an Allen wrench. The wedges will remain unmoved in the body member since the taper of the wedges is sufficiently gradual to render them self-locking. Each of screws 32 is then advanced until its end is spaced apart from body member 12 a distance equal to the taper ratio of the wedges multiplied by the permissible deformation of the work. For example, if the wedges may be expanded to a diameter .002 of an inch greater than the internal diameter of the work without objectionably deforming the work, and the wedges have a 5 to 1 taper, limit screws 32 are set .005 of an inch away from body member 12. An ordinary feeler gauge may be used for this purpose. Then, while holding the work against rotation, mandrel 2 is turned, as by a wrench on lug 8, to force sleeve 26 and screws 32 toward body member 12. When screws 32 contact body member 12, thus stopping any further expansion of the wedges, the work will be held at just the proper degree of tension. Lock nut 34 may then be tuned up solidly against body member 12. It will be understood that for many types of work, for example in most lathe work, the work 38 may be gripped with sufficient force merely by expanding the wedges to a hand-tight fit in the work. When the limit screws 32 have been set as described, when subsequent pieces of work of the same diameter are placed over the tool, screws 32 will function automatically to limit the expansion of the wedges to the proper diameter. The ball bearing 28 serves to reduce the torque required to turn the body member up tight. Were it not for the bearing, the final tightening would be accompanied by considerable friction between the wedges and sleeve 26, or between the sleeve and washer 30 or shoulder 10. Besides increasing the operating torque, this would also impose an undesirable transverse bending stress on the wedges.

Figs. 12 and 13 show the tool adapted to hold a piece of thin planar work 40 at right angles to the axis of the mandrel. This adaptation requires the use of a face plate 42 threaded on mandrel 2 between bearing 28 and anti-friction collar 30, a face plate 44 threaded on the mandrel at the opposite end of body member 12, and a pair of cylindrical spacer sleeves 46 and 48 disposed about the tool between said face plates. The face plates and sleeves are of substantially greater diameter than body member 12. The contiguous ends of said spacer sleeves bear against opposite sides of the planar work 40, while the distal ends of the sleeves bear operatively against the inner faces of said face plates. The inner face of face plate 44 is formed conically co-axially with mandrel 2, whereby sleeve 46 is centered about said mandrel. A lock nut 50 is threaded on mandrel 2 adjacent the outer surface of face plate 44.

In gripping the planar work 40, the limit screws 32 are first set to grip the inner diameter 52 of the work in the manner described above and the wedges are again expanded to a hand tight fit with the work. At this point the limit screws 32 are of course spaced slightly apart from body member 12. Face plate 44 is then turned to advance it to a hand-tight contact with spacer sleeve 46. Then, while holding the spacer sleeves or the work against rotation, mandrel 2 is turned by means of a wrench on lug 8, to force limit screws 32 against body member 12 and simultaneously to draw face plate 44 toward face plate 42, whereby work 40 is clamped between spacer sleeves 46 and 48. Body member 12 and face plate 44 are prevented from rotating with the mandrel by their frictional contact with work 40 and sleeve 46. Thus the limit screws 32 serve not only as a limit for the expanding movement of the wedges, but also for limiting the clamping force of sleeves 46 and 48 on the sides of the work.

Figs. 14 to 21 show the device adapted for use as a tool for pulling bearing bushings, races, and the like from bearing housings, Figs. 14 to 16 showing the tool particularly adapted for use in pulling straight cylindrical bushings. The structure shown therein is substantially the same as that in the work holding adaptations of the tool, except that the mandrel 54 is threaded along substantially its entire length and is made substantially long to extend out of the bearing housing 56, and is fitted at its outer end with a hexagonal cap nut 58, which may be utilized for turning the mandrel with a wrench. A collar 60 is fixed on said mandrel by set screw 62, its end surface forming a shoulder 64 against which anti-friction collar 30 abuts. The wedges 66 are substantially similar to wedges 18 of the work holding adaptations of the tool, except that each wedge 66 is provided at its smaller end with an ear 68 extending radially to the axis of the mandrel. Mandrel 54 extends through a central hole 70 provided in a face plate 72, which bears against the outer end of bearing housing 56. A jack nut 74 threaded on the mandrel bears against a ball thrust bearing 76 disposed between the nut and the outer surface of face plate 72.

In operation, body member 12 and lock nut 34 are backed away from sleeve 26 until wedges 66 can be retracted inwardly sufficiently to permit ears 68 of the wedges to pass through the bearing bushing 78 to be removed after the tool has been thus positioned, mandrel 54 is turned to advance collar 60 and sleeve 26 against wedges 66 to expand said wedges. While the wedges are still loose in the bushing, they are urged by gravity against the lower part of the bushing, and this is sufficient to prevent body member 12 from rotating with the mandrel as it is turned. As soon as ears 68 of the wedges are moved to a diameter larger than the internal diameter of bushing 78, an outward pull is exerted on the mandrel to bring ears 68 of the wedges into contact with the inner end of bushing 78, and while maintaining said pull, the mandrel is turned until the wedges are brought into contact with the inner surface of the bushing. Nut 58 may be utilized for turning the mandrel. Then, by turning the jack nut against face plate 72, the mandrel 54 may be pulled outwardly from the bearing housing 56, and bushing 78 will be drawn outwardly from its seat in the housing by ears 68 of the wedges. It is apparent that limit screws 32 carried by sleeve 26 may be utilized in the bearing puller to limit the expansion of wedges 66. It is important that the bushing 78 be supported along its inner surface as well as its end surface as it is pulled, since this will prevent canting or chattering of the bushing as it is pulled. For this purpose the wedges should be expanded snugly against the bushing. At the same time the engagement of the wedges with the bushing should not be so tight as to expand the bushing, since then the bushing would be extremely difficult to pull; nor to indent or mar the operative bearing surface of the bushing. Limit screws 32 may obviously be adjusted to provide the proper grip on the bushing.

Figs. 17 to 21 show the tool adapted for use in pulling the races of tapered roller bearings, and is substantially similar to the form shown in Figs. 14 to 16 except for the form of the wedges and the provision of an adjustable connection between the wedges and the operating sleeve 26. The wedges 80 are each provided with an ear 82 at their smaller ends, said ear extending radially to the mandrel, and each is formed to present a tapered notch 84 adjacent said ear, said notch conforming to the contour of the inner face of the bearing race 86. Notches 84 are adapted to be moved into engagement with the race in the manner previously described for the wedges 66 shown in Figs. 14 to 16, limit screws 32 serving to control the pressure of the wedges on the race.

Secured in the larger end of each wedge 80 and extending longitudinally therefrom parallel to the axis of mandrel 54 is an elongated machine screw 88. These screws extend through radially slotted holes 90 in operating sleeve 92, which corresponds to sleeve 26 of the previously described forms and which carries limit screws 32. Holes 90 are disposed intermediate screws 32. At the outer end of sleeve 92, each hole 90 is provided with an enlargement 94 for containing head 96 of the associated screw 88. The principal function of screws 88 is to maintain the end of wedges 80 in properly spaced relation when said wedges are extended considerable distances from the body member 12. This is particularly important in tools of larger sizes, or whenever the wedges are slender and long. As the wedges move in the body member screws 88 move radially in slotted holes 90. Screws 88 also serve to keep sleeve 92 in engagement with the ends of wedges 80. It will be noted that positioning screws would be equally useful in any of the work holding or bearing puller adaptations shown, and may be considered as a modification thereof. It will be noted also that while the forms shown in Figs. 14 to 16 and Figs. 17 to 21 are described primarily as bearing pullers, the wedges in both forms are provided with outer edge portions parallel to the axis of the mandrel, and are thus adapted for use as work holding tools for holding tubular or planar work in the same manner as the forms shown in Figs. 1 to 13.

While we have shown specific embodiments of our invention, it is readily apparent that many minor variations of construction and operation could be made without departing from the spirit of the invention.

What we claim and desire to cover by Letters Patent is:

1. A work holding tool comprising a mandrel adapted to be mounted between lathe centers or the like, a cylindrical body member carried co-axially on said mandrel intermediate the ends thereof, said body member having a plurality of peripherally spaced longitudinal grooves formed therein, said grooves being of uniformly tapered depth along the entire length of said body member, a wedge carried slidably in each of said grooves and projecting outwardly from the deeper ends of said grooves, the outer surfaces of said wedges being parallel to the axis of said body member, a member carried by said mandrel and abutting against the extending ends of said wedges, means for moving said body member and said abutment member relatively closer together, a stop member carried by said abutment member and extending longitudinally therefrom and adapted to contact said body member to limit said movement, and means for adjusting the extension of said stop member.

2. A work holding tool comprising a mandrel adapted to be mounted between lathe centers or the like, a cylindrical body member carried co-axially on said mandrel intermediate the ends thereof, said body member having a plurality of peripherally spaced longitudinal grooves formed therein, said grooves being of uniformly tapered depth along the entire length of said body member, a wedge carried slidably in each of said grooves and projecting outwardly from the deeper ends of said grooves, the outer surfaces of said wedges being parallel to the axis of said body member, a member carried by said mandrel and abutting against the extending ends of said wedges, means for moving said body member and said abutment member relatively closer together, and a plurality of adjustably extensible screws carried by said abutment member and adapted to contact said body member whereby the relative movement of said abutment member and said body member is limited.

References Cited in the file of this patent

UNITED STATES PATENTS

| 436,223 | Evely | Sept. 9, 1890 |
| 447,667 | Dubrule | Mar. 3, 1891 |
| 465,075 | Grantland | Dec. 15, 1891 |
| 854,242 | Scott | May 21, 1907 |
| 1,654,737 | Kistner | Jan. 3, 1928 |
| 1,705,789 | Steirly | Mar. 19, 1929 |
| 1,840,736 | Ostlind | Jan. 12, 1932 |
| 2,255,885 | Herbst | Sept. 16, 1941 |
| 2,518,508 | Van Bever | Aug. 15, 1950 |

FOREIGN PATENTS

| 9,302 | Great Britain | June 30, 1887 |